United States Patent [19]

Young

[11] Patent Number: 4,964,265
[45] Date of Patent: Oct. 23, 1990

[54] REMOTELY CONTROLLED LAWN MOWER

[76] Inventor: Carl W. Young, P.O. Box 150, Isola, Miss. 38754

[21] Appl. No.: 405,139

[22] Filed: Sep. 11, 1989

[51] Int. Cl.⁵ .................... A01D 34/78; B62D 5/04
[52] U.S. Cl. ............................ 56/10.8; 56/13.5; 56/DIG. 7; 180/167
[58] Field of Search .............. 56/108, 14.7, 16.7, 56/17.5, 10.1, 1, 10.2, 10.6, 10.7, 10.8, 13.5, 15.4, 16.9, 17.2, DIG. 7; 180/79, 79.1, 65.1, 167, 169; 340/825.69, 825.72; 446/454, 456

[56] References Cited

U.S. PATENT DOCUMENTS

| | | | |
|---|---|---|---|
| 3,095,937 | 7/1963 | Vulliet-Durand | 446/456 |
| 3,789,939 | 2/1974 | Geislinger | 56/10.2 |
| 3,800,902 | 4/1974 | Keller | 56/10.5 |
| 4,184,559 | 1/1980 | Rass | 180/169 |
| 4,318,266 | 3/1982 | Taube | 56/10.5 |
| 4,844,493 | 7/1989 | Kramer | 180/169 |

*Primary Examiner*—Ramon S. Britts
*Assistant Examiner*—Terry Lee Melius
*Attorney, Agent, or Firm*—Rogers & Killeen

[57] ABSTRACT

A lawn mower that is remotely controlled and self-propelled. The lawn mower is propelled by battery powered electric motors that drive a set of wheels that are fixed in relation to the frame. Steering is accomplished through a belt and pulley system generally aligned with the forwardly mounted steering wheels. A battery powered electric motor rotates a center pulley, that in turn rotates pulleys for positioning the steering wheels in relation to the frame. Direction and speed of the mower may be controlled with a two channel radio. Frustro-conical wheel projections may be provided to help cross uneven terrain. Cutting height adjusters for the wheels may also be provided.

13 Claims, 2 Drawing Sheets

REMOTELY CONTROLLED LAWN MOWER

BACKGROUND OF THE INVENTION

The present invention relates to remotely controlled, self-propelled lawn mowers. More particularly, it relates to remotely controlled, four wheel, self-propelled lawn mowers that use a belt and pulley system for steering control and electric power to propel the mower.

The history of remotely controlled lawn mowers from sheep to preprogrammed robots is replete with devices and techniques for easing the onerous lawn cutting task. Each inventor has faced the two basic elements of the problem, directional control and propulsive power, with varying degrees of success. It is known, for example, to use multiple gears to control forward, reverse, left and right motions. Such devices, however, may be difficult to produce due to the strict manufacturing tolerances and, importantly for the consumer, may be prone to failure and difficult to repair. (See U.S. Pat. No. 4,318,266 to Taube and U.S. Pat. No. 3,800,902 to Keller).

While other steering techniques using a belt and pulleys are generally known in remote control vehicles, these techniques have not been successfully applied to lawn mowers, probably due to the inefficiency or complexity of their arrangement or to their inability to adapt to the demanding mechanical stresses of a lawn mower. (See, for example, U.S. Pat. No. 3,095,937 to Vulliet-Durand).

While it is known to use direct current electric motors to propel a remotely controlled lawn mower, the position of the steering wheels in such mowers is fixed relative to the frame of the mower. Maneuvering a mower with fixed steering wheels may tend to tear up the lawn being mowed and may tend to unacceptably reduce mower speed when one wheel is slowed to turn the mower. See, for example, U.S. Pat. No. 3,789,939 to Geislinger.

It is accordingly an object of the present invention to provide a novel remotely controlled lawn mower that obviates the problems of the prior art and that is easy to use and that may be produced from relatively simple and low cost parts.

It is a further object of the present invention to provide a novel remotely controlled lawn mower that uses a simple and compact belt and pulley steering mechanism.

It is yet a further object of the present invention to provide a novel remotely controlled lawn mower that uses a battery to rotate a first set of drive wheels that are fixed in relation to the mower frame and to movably position a second set of steering wheels relative to the frame.

It is another object of the present invention to provide a novel remotely controlled lawn mower that prevents the mower from losing four-point contact with uneven terrain.

It is still another object of the present invention to provide a novel remotely controlled lawn mower that has wheel adjustments for setting lawn mowing height.

These and many other objects and advantages will be readily apparent to one skilled in the art to which the invention pertains from a perusal of the claims, the appended drawings, and the following detailed description of preferred embodiments.

THE DRAWINGS

DESCRIPTION OF PREFERRED EMBODIMENTS

Figure 1:
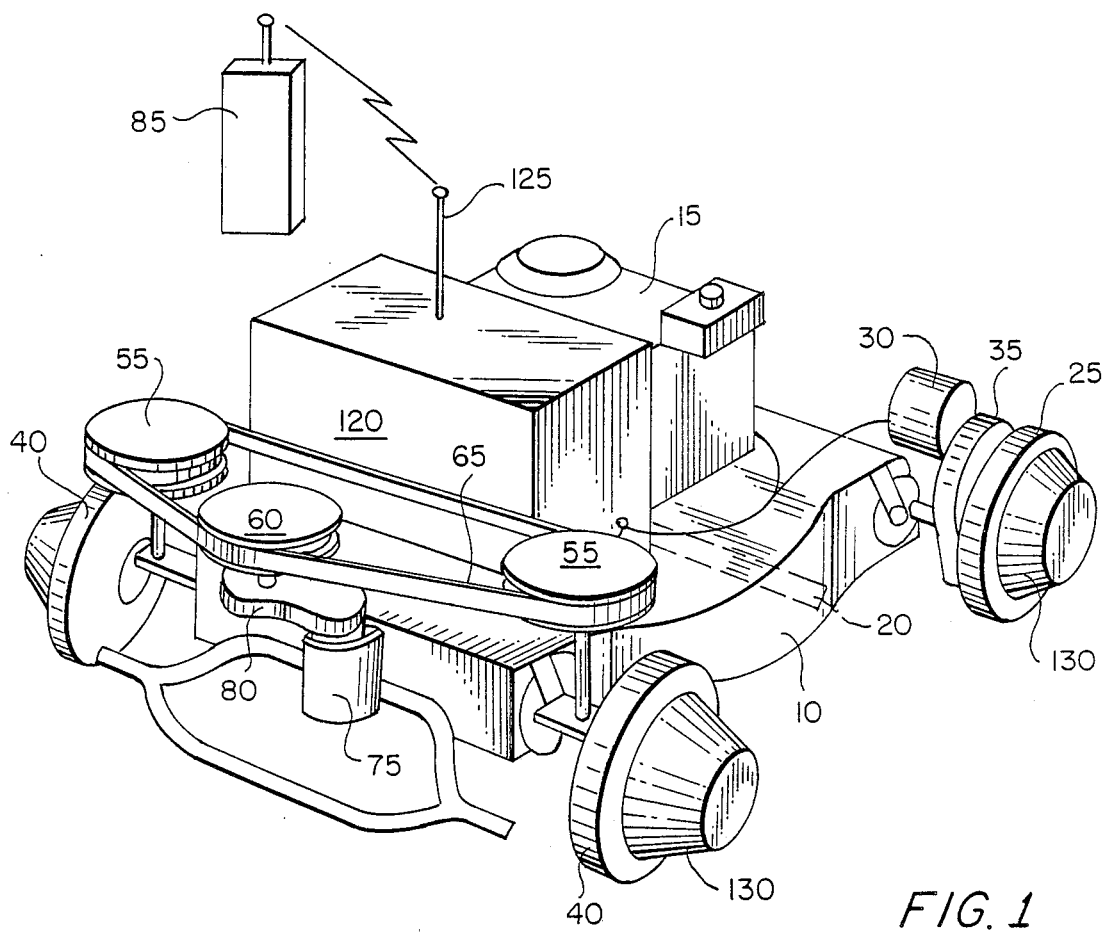
FIG. 1 is a pictorial representation of a perspective view of a remotely controlled lawn mower of the present invention.

With reference now to the figures where like elements have been given like designation to facilitate an understanding of the present invention, and particularly with reference to FIG. 1, the remotely controlled lawn mower of the present invention may include a commercially available four-wheel rotary lawn mower frame 10 and engine 15 for powering a blade 20, The operation of the engine and blade is independent of the steering and propulsion functions of the present invention and, thus, engine power is not a consideration.

With further reference to FIG. 1, the present invention may include a pair of driving wheels 25 for propelling the mower that may be carried by the rear portion of the frame 10. The wheels 25 may be powered by one or two direct current electric motors 30 connected to the wheels with appropriate reduction gears 35. The motors 30 should have sufficient power to be able to propel the mower at about 2 to 3 miles per hour. Two six-volt motors have been found to be adequate for a typical household mower. The motors 30 may also be reversible.

The present invention may also include a pair of freely rotating steering wheels 40 carried by the forward portion of the frame 10 for controlling the direction of motion of the mower. As may be more clearly seen in FIG. 2, each steering wheel 40 may be mounted on an elbow stub axle 45 supported by frame-mounted brackets 50. The other end of the elbow stub axle 45 extends vertically above the deck of the frame 10. When the stub axle 45 is rotated, the wheel 40 moves its position relative to the frame.

Steering wheels 40 may be moved relative to the frame through a novel arrangement of belt and pulleys. A pair of first pulleys 55 may be horizontally mounted on the vertically ascending end of stub axles 45 above the steering wheels 40 so that when the pulleys 55 are rotated, wheels 40 move circumferentially about the pulleys 55 thereby steering the mower. A second pulley 60 may be positioned above the deck of the frame 10 between first pulleys 55 so that its radially outward edge is slightly spaced apart from a line tangential to both pulleys 55. A belt 65 may be provided about pulleys 55 and 60 so that movement of second pulley 60 causes pulleys 55 to rotate. The belt 65 may be continuous, encircling the three pulleys (see FIG. 3). The belt may also be discontinuous, extending in one direction only between the pulleys (see FIG. 1). A discontinuous belt may be affixed to the first pulleys 55. The movement of steering wheels 40 relative to the frame may be coordinated with a tie-rod 70 hingedly connected to the axles 45.

The second pulley 60 may be driven by a direct current electric motor 75 through appropriate reduction gears 80. A six-volt motor has been found to be adequate. The motor 75 may also be reversible.

Figure 4:
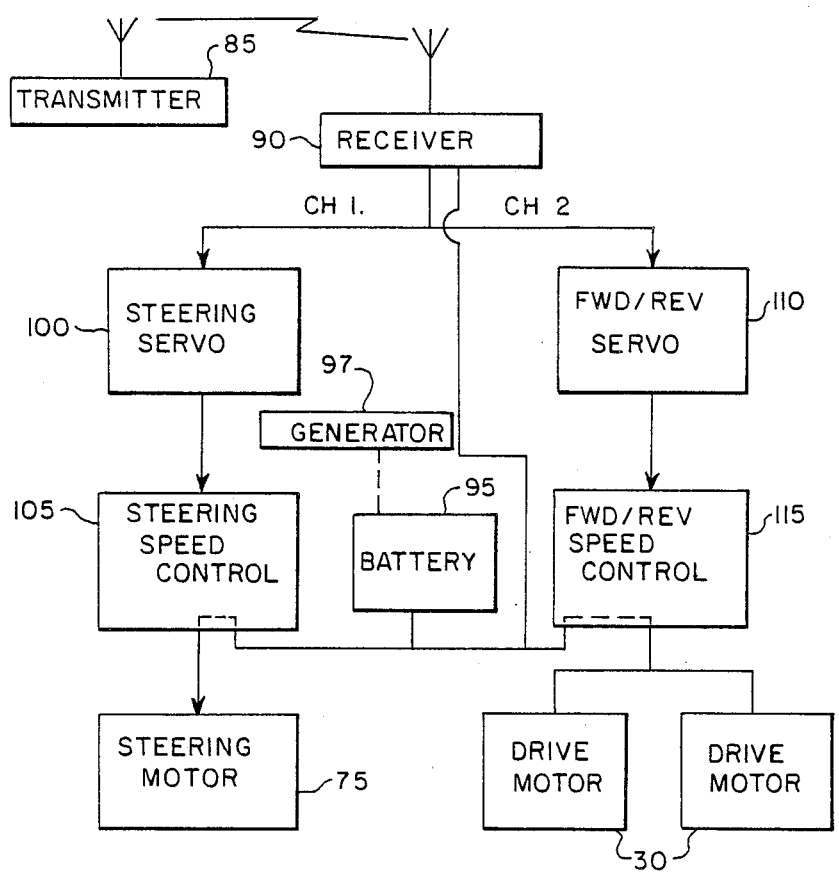
FIG. 4 is a block diagram of an embodiment of the remote control portion of the present invention.

With reference now to FIG. 4, the portion of the present invention for remotely controlling the lawn mower may include a commercially available multi-channel transmitter 85 and receiver 90, such as for use in remotely controlled model airplanes, and one or more batteries 95 for powering the receiver 90. The batteries 95 may also be used to power the motors for second pulley 60, and driving wheels 25.

One of the channels of the transmitter and receiver may be allocated for steering and a second for forward-/reverse and velocity commands. Steering directions received at the receiver 90 on the first channel may be provided to a steering servomotor 100. The servomotor 100 translates the received directions into electronic commands or into movement of a mechanical link for regulating a steering speed controller 105. The steering controller 105 also may be connected to the output of the battery 95. The steering speed control 105 regulates the power provided to the steering motor 75 and thereby determines the direction and rate of turn.

In a similar arrangement, the directions for forward-/reverse and velocity received on the second channel may be translated into power for the drive motors 30. A servomotor 110 responsive to directions related to forward and reverse velocity may control, either electronically or through a mechanical link, the forward/reverse speed controller 115, which in turn controls the velocity of the mower through the motors 30.

Two six-volt, nine ampere rechargeable batteries connected in parallel have been found to be adequate for a typical household mower. A generator 97 powered by the engine 15 may be provided to charge the batteries 95.

Figure 3:
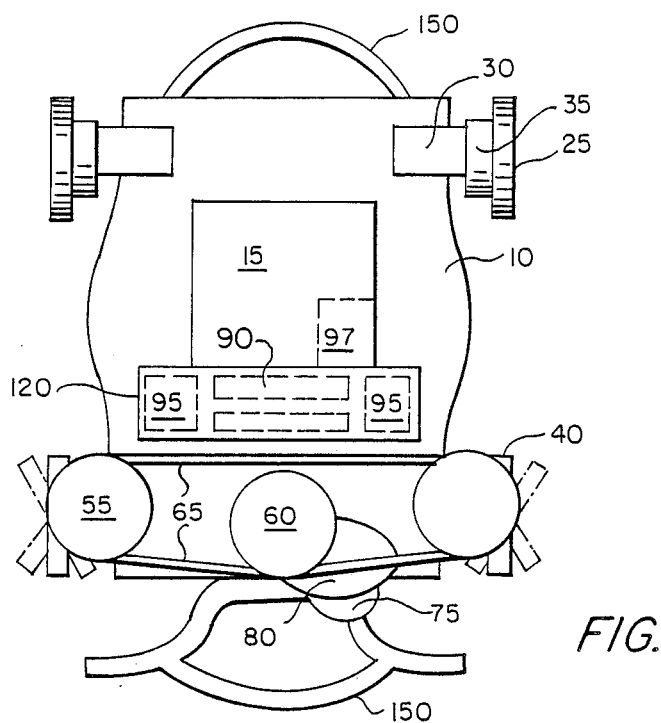
FIG. 3 is a pictorial representation of a top plan view of another embodiment of the lawn mower of the present invention.

With further reference to FIG. 3, the remote control components may be situated atop the frame in a housing 120. The housing 120 may enclose the battery 95, receiver 90, servos 100 and 110, and controllers 105 and 115. An antenna 125 may be positioned atop the housing 120.

As seen in FIG. 1, another embodiment of the present invention may include frustro-conical projections 130 carried by the wheels 25 and 40. The projections 130 help prevent the mower from losing contact with uneven terrain. If the mower were operated in such a manner that one or more of the wheels 25 and 40 lost contact with the terrain, the mower might tip, lose steering control or have insufficient propulsive power to move. The projections 130 maintain contact with the terrain when the wheel loses contact, helping to prevent the aforementioned problems.

Figure 2:
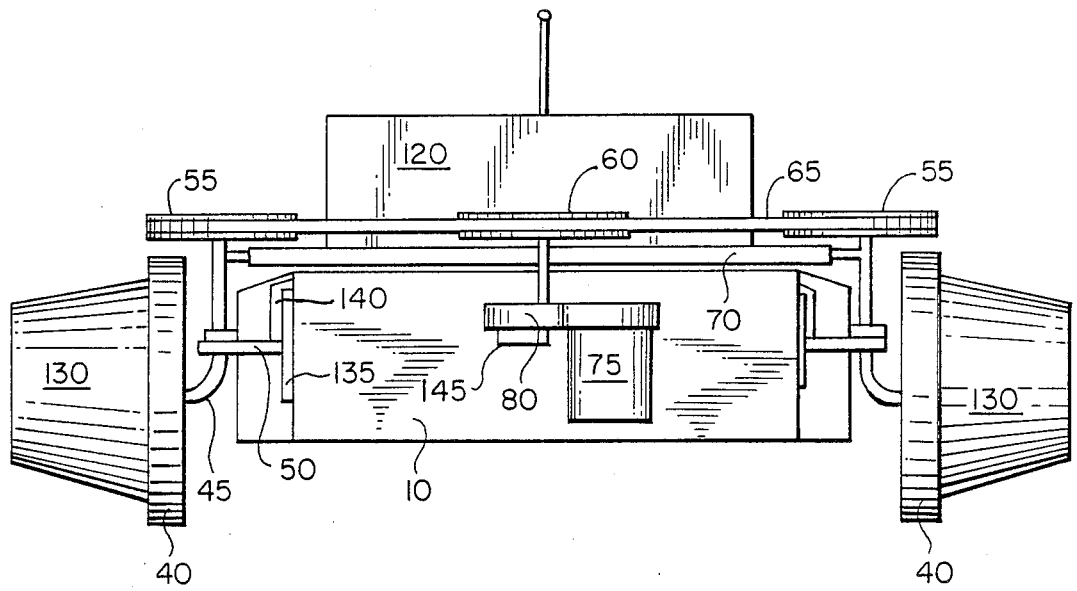
FIG. 2 is a pictorial representation of a front view of the embodiment shown in FIG. 1.

As seen in FIG. 2, another embodiment of the present invention may include wheel-height adjusters 135 for selectably adjusting the cutting height of the mower. Such adjusters are known in the art and are generally rotably affixed to the frame 10 and to the axle of the wheel. A ratcheted lever 140 may be moved to seleCt mowing height. A height adjuster 145 may also be provided for second pulley 60 (or for the motor 75 and gear box 80) so that pulley 60 is maintained in the approximate horizontal plane of the first pulleys 55.

With reference again to FIG. 3, front and rear bumpers 150 may be provided to protect the control components and to provide for hand transport of the mower. A detachable handle (not shown) for pushing or pulling the mower may also be provided.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

I claim:

1. A remotely controlled, self-propelled lawn mower comprising:
   (a) a frame;
   (b) means carried by said frame for cutting a lawn;
   (c) a radio transmitter with plural channels for transmitting signals, said signals directing movement of said lawn mower;
   (d) a radio receiver with plural channels carried by said frame for receiving the signals from said transmitter;
   (e) a first pair of ground engaging wheels carried by the forward portion of said frame, one each on stub axles, and selectively positioned with respect to said frame for steering said lawn mower;
   (f) a second pair of ground engaging wheels carried by the rear portion of said frame in a predetermined position with respect thereto for propelling said lawn mower;
   (g) first and second direct current electric motors, each for imparting forward and reverse rotary motion and variable velocity to one of said second pair of wheels; said motors being operatively connected to said receiver and responsive to signals received from said transmitter on a first one of said plural channels;
   (h) a third direct current electric motor for positioning said first pair of wheels with respect to said frame, said third motor being operatively connected to said receiver and responsive to signals received from said transmitter on a second one of said plural channels;
   (i) a battery for providing power to said three motors and to said receiver;
   (j) three pulley means connected by a belt,
   a first one of said three pulley means being carried by the forward portion of said frame between said first pair of wheels and operatively connected to said third motor,
   the second and third ones of said three pulley means being operatively connected to one each of said stub axles to control the position of said first pair of wheels relative to said frame,
   each of said stub axles having one of said first pair of wheels at one distal end and one of said second and third pulleys at the other distal end, and having a shape so that rotary motion of said one pulley effects circumferential movement of said one wheel about said one pulley,
   whereby movement of said belt responsive to said third motor effects the rotation of said second and third pulley means to steer the mower; and
   (k) four frustro-conical protectors, each carried by and projecting outwardly from one of said wheels, for inhibiting the loss by said lawn mower of four-point contact with the ground in the event of uneven terrain.

2. The lawn mower as defined in claim 1 wherein said battery comprises two six volt, nine ampere power cells.

3. The lawn mower as defined in claim 1 wherein said belt is continuous.

4. The lawn mower as defined in claim 1 wherein said belt is discontinuous and attached to said second and third pulleys.

5. The lawn mower as defined in claim 1 further comprising a generator powered by said means for cutting a lawn for charging said battery.

6. The lawn mower as defined in claim 1 further comprising plural adjuster means for selectably adjusting the relative position of said two pairs of wheels relative to said frame so that the lawn cutting height may be selectively adjusted and means for selectably adjusting the position of said first pulley relative to said second and third pulleys so that all three of said pulleys are connected by said belt when said first pair of wheels are adjusted by said adjuster means.

7. A remotely controlled, self-propelled lawn mower comprising:
(a) a frame having means for cutting a lawn;
(b) a radio transmitter for transmitting signals directing movement of said lawn mower;
(c) a radio receiver carried by said frame for receiving signals from said transmitter;
(d) a pair of steering wheels carried by said frame on stub axles and movably positioned with respect to said frame for steering said lawn mower;
(e) a pair of driving wheels carried by said frame for propelling said lawn mower;
(f) one or more electric motors for imparting rotary motion and variable velocity to said pair of driving wheels responsively to signals received at said receiver;
(g) an electric motor for positioning said steering wheels with respect to said frame responsively to signals received at said receiver;
(h) a battery for providing power to said motors; and
(i) three pulleys carrying a belt thereabout for steering said lawn mower, a first of said pulleys being operatively connected to said motor for positioning said steering wheels and the two other said pulleys being operatively connected to said stub axles, whereby movement of said belt causes said steering wheels to be positioned with respect to said frame.

8. The lawn mower as defined in claim 7 wherein said transmitter and said receiver each comprise plural channels, and wherein said motor for positioning said steering wheels responds to signals received on a first of said channels and said one or more motors for imparting motion to said driving wheels respond to signals received on a second of said channels.

9. The lawn mower as defined in claim 7 further comprising four frustro-conical protectors, each carried by and projecting outwardly from one of said wheels, for inhibiting the loss of four-point contact with the ground by said lawn mower in the event of uneven terrain.

10. The lawn mower as defined in claim 7 further comprising plural adjusters for selectably adjusting the position of the center of said wheels relative to said frame so that the lawn cutting height may be set.

11. The lawn mower as defined in claim 10 wherein said first pulley comprises a height adjuster for selectably adjusting the position of said first pulley with respect to the other two said pulleys so that said three pulleys carry said belt.

12. The lawn mower as defined in claim 7 wherein said battery comprises two six-volt power cells.

13. The lawn mower as defined in claim 7 wherein one each of said two other pulleys is connected to a distal end of the stub axle of one of said steering wheels, each said stub axle being shaped so that rotary motion of said one pulley effects circumferential motion of said one wheel about said one pulley.

* * * * *